(12) United States Patent
Furuichi et al.

(10) Patent No.: US 8,380,937 B2
(45) Date of Patent: Feb. 19, 2013

(54) SYSTEM FOR PREVENTING UNAUTHORIZED ACQUISITION OF INFORMATION AND METHOD THEREOF

(75) Inventors: Sanehiro Furuichi, Tokyo (JP); Yuriko Kanai, Tokyo (JP); Masana Murase, Yokohama (JP); Tasuku Otani, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 714 days.

(21) Appl. No.: 12/095,033

(22) PCT Filed: Nov. 28, 2006

(86) PCT No.: PCT/JP2006/323748
§ 371 (c)(1),
(2), (4) Date: Dec. 2, 2009

(87) PCT Pub. No.: WO2007/061119
PCT Pub. Date: May 31, 2007

(65) Prior Publication Data
US 2010/0071034 A1    Mar. 18, 2010

(30) Foreign Application Priority Data
Nov. 28, 2005   (JP) .................................. 2005-341712

(51) Int. Cl.
*G06F 13/00* (2006.01)
*G06F 13/28* (2006.01)

(52) U.S. Cl. .............. 711/147; 726/27; 726/33; 726/26; 713/189; 713/193; 711/100; 711/130; 711/154; 711/148; 710/28; 710/36; 710/37; 710/38; 710/200; 709/213; 709/214; 707/694

(58) Field of Classification Search ........................ 726/4
See application file for complete search history.

(56) References Cited

U.S. PATENT DOCUMENTS 5,890,140 A    3/1999   Clark
6,594,765 B2   7/2003   Sherman
(Continued)

FOREIGN PATENT DOCUMENTS

| JP | 4068587 | 3/1992 |
|---|---|---|
| JP | 5327121 | 12/1993 |

(Continued)

OTHER PUBLICATIONS

"Microsoft Windows Server 2003 Technical Overview of Terminal Services", Jan. 2005, pp. 1-13.
(Continued)

*Primary Examiner* — Nathan Flynn
*Assistant Examiner* — Bryan Wright
(74) *Attorney, Agent, or Firm* — William Stock; Anne Vachon Dougherty

(57) ABSTRACT

A system including a server apparatus executes an application program and a client apparatus enabling a user to utilize the application program by communicating with the server apparatus based on an instruction of the user. The server apparatus includes: an output detection section for detecting output-processing which is processing of outputting data from the application program into a shared area; and an output control section for storing instruction information in the shares area, instead of storing the output data outputted from the application program therein, in response to the detection of the output-processing, the instruction information specifying an acquisition method by which an authorized client apparatus acquires the output data. The client apparatus includes: a reading detection section for detecting reading-processing which is processing of reading data from the shared area; and a reading control section which reads the instruction information from the shared area in response to the detection of the reading-processing, and which acquires the output data by the acquisition method specified by the instruction information.

15 Claims, 12 Drawing Sheets

U.S. PATENT DOCUMENTS

| | | | |
|---|---|---|---|
| 6,720,583 B2 | 4/2004 | Nunoue | |
| 7,313,825 B2 | 12/2007 | Redlich | |
| 2002/0095359 A1* | 7/2002 | Mangetsu | 705/30 |
| 2002/0154332 A1 | 10/2002 | Inai | |

FOREIGN PATENT DOCUMENTS

| | | |
|---|---|---|
| JP | 2002359434 | 12/2002 |
| TW | 200535746 | 11/2005 |
| WO | WO2005050801 | 6/2009 |

OTHER PUBLICATIONS

"Citrix Presentation Server", http://www.citrix.co.jp/products/mps/construction.html.

* cited by examiner

| IP ADDRESS | PORT | PASSWORD |
|---|---|---|
| xx.YY.ZZ.WW | AA | XXXXXX |

240 and# SYSTEM FOR PREVENTING UNAUTHORIZED ACQUISITION OF INFORMATION AND METHOD THEREOF

BACKGROUND OF THE INVENTION

The present invention relates to a system for preventing unauthorized acquisition of information, and a method thereof. The present invention particularly relates to a system for preventing an unauthorized client apparatus from acquiring information from a server apparatus, and a method thereof.

In recent years, server-based computing (hereinafter, referred to as SBC) has drawn attention as a technique for preventing leakage of information. In the SBC, a server apparatus executing an application program, while a client apparatus displays an output from the server apparatus on a screen, or transmits an input of a user to the server apparatus. Therefore, data necessary for executing the application program and execution results are stored only in the server apparatus, but are not stored in the client apparatus. In this manner, unauthorized acquisition of confidential information through the client apparatus can be prevented.

In order to thoroughly preventing leakage of information, it is preferable that the client apparatus do not have its own storage device therein, and that the client apparatus should be a dedicated terminal (called a thin client) provided only with an input device and a display section. However, such dedicated terminals have not been widespread in comparison with personal computers, and therefore, there is a problem that introduction of a dedicated terminal requires cost time and money. Additionally, if the client apparatus includes its own storage device therein, an application program which uses no confidential information can be operated in the client apparatus, thereby making it possible to reduce a load on the server apparatus. For this reason, there are many cases where a personal computer or the like is used as the client apparatus of the SBC, under present circumstances.

However, as long as the client apparatus includes its own storage device therein, there is a risk that confidential information used in the server apparatus might be copied into the storage device of the client apparatus, and be taken out illegally. For example, in a Windows terminal server (refer to Microsoft Corporation, "Terminal Service," on the microsoft.com website using the following information technet/prodtechnol/windowsserver2003/ja/library/ServerHelp/7c464857-fe19-4cdf-a39b-dac3ff9b6b7c.mspx) or the like, a clipboard function for enabling the server apparatus and the client apparatus to share information in a virtual way is provided for the purpose of enhancing convenience of a user. By means of this function, it is possible to output data (not a displayed image of a screen, but editable data such as character string data or numerical data) into a clipboard from the server apparatus, and then, to copy the data into the storage device of the client apparatus.

On the other hand, in the Windows terminal server, MetaFrame of Citrix Systems Inc. (refer to Citrix Systems Inc., "Mechanism of MetaFrame Presentation Server," available on the citrix.com.jp web site under products/mps/construction.html or the like, a function of limiting accesses depending on an MAC address and an IP address of a client apparatus is provided. However, there is a case where an access from an unauthorized client apparatus is admitted when the IP address and the MAC address are impersonated. Additionally, with this function, it is possible to uniformly prohibit any of accesses from a client apparatus regardless of kinds of the accesses, but it is not possible to prohibit only an access of a specific kind. For example, this function cannot control a certain client apparatus so as to be allowed only to read information, but concurrently, to be prohibited from taking out the information.

SUMMARY OF THE INVENTION

An object of the present invention is to provide a system, a method, a program, a server apparatus and a client apparatus, which are capable of solving the abovementioned problems. This object is achieved by a combination of features described in independent claims in the scope of claims. In addition, dependent claims define still more advantageous examples in the present invention.

In order to solve the abovementioned problems, in an embodiment of the present invention, provided is a system including a server apparatus executing an application program and a client apparatus enabling a user to utilize the application program by communicating with the server apparatus based on an instruction of the user. In this system, the server apparatus includes: an output detection section for detecting output processing which is processing of outputting data from the application program into a shared area used for having information shared between the server apparatus and the client apparatus; and an output control section for storing instruction information in the shared area, instead of storing the output data outputted from the application program therein, in response to the detection of the output-processing, the instruction information specifying an acquisition method by which an authorized client apparatus acquires the output data. Moreover, in this system, the client apparatus includes: a reading detection section for detecting reading processing which is processing of reading data from the shared area; and a reading control section which reads the instruction information from the shared area in response to the detection of the reading processing, and which acquires the output data by the acquisition method specified by the instruction information.

It should be noted that all of necessary features of the present invention are not listed in the abovementioned summary of the present invention, and that any sub-combination consisting of a group of these features can be also considered as the present invention.

BRIEF DESCRIPTION OF THE DRAWINGS

For a more complete understanding of the present invention and the advantages thereof, reference is now made to the following description taken in conjunction with the accompanying drawings.

DETAILED DESCRIPTION OF THE PREFERRED EMBODIMENT

The present invention will be described by use of an embodiment of the invention hereinbelow, however, the following embodiment does not limit the invention described in the scope of claims. Furthermore, it is not necessarily the case that all of the combinations of the features described in the embodiment are essential to solving means of the invention.

Figure 1:
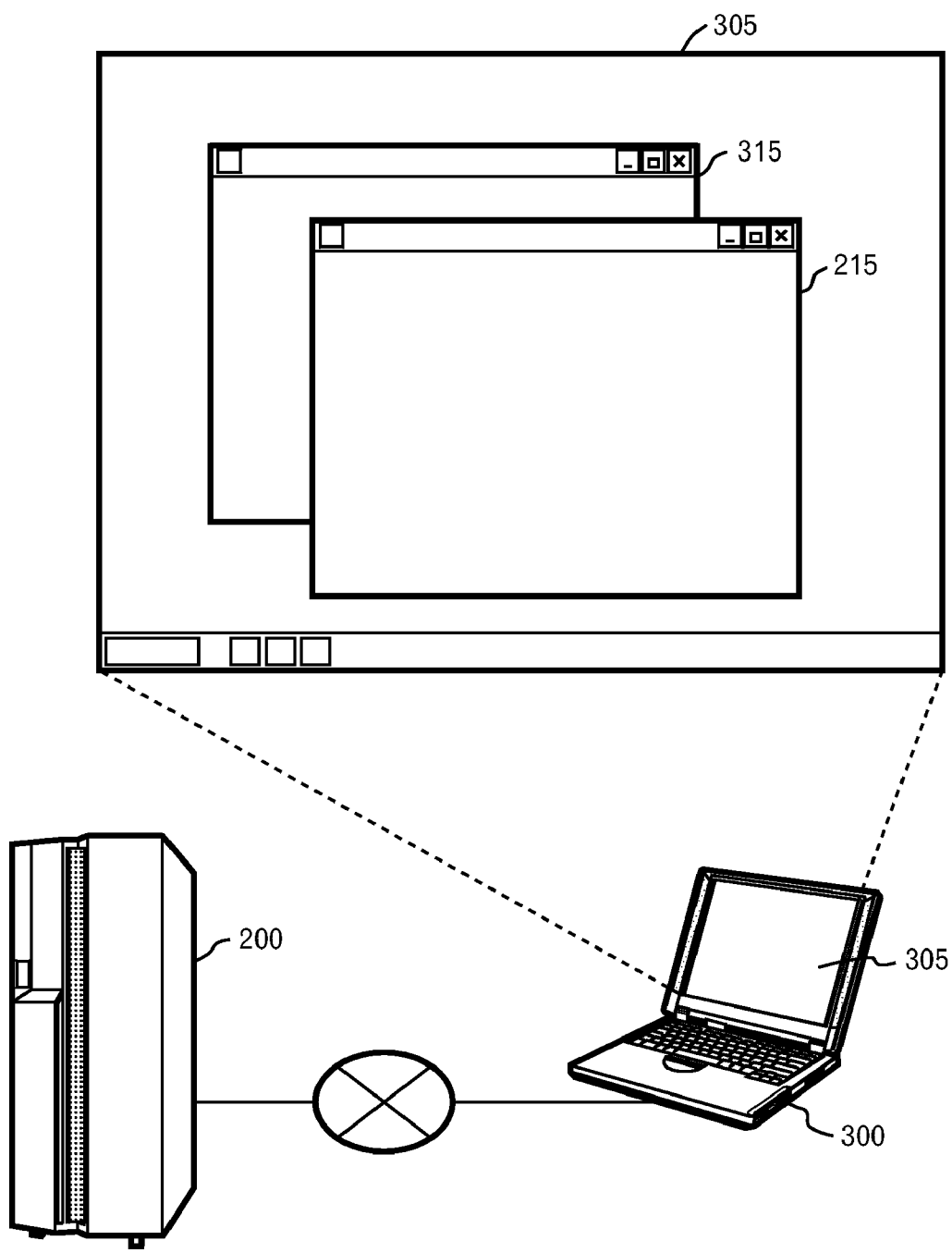
FIG. 1 shows an entire configuration of an information processing system 10.

FIG. 1 shows an entire configuration of an information processing system 10. The information processing system 10 includes a server apparatus 200, and a client apparatus 300. The server apparatus 200 executes an application program for a user, and provides a display screen to the client apparatus 300 as a display image of a screen. The client apparatus 300 allows a user to use the application program, by communicating with the server apparatus 200 based on an instruction of the user. To be more precise, a display section 305 included in the client apparatus 300 displays not only an application window 315 which is a display screen of an application program operating in the client apparatus 300, but also an application window 215 which is a display screen of an application program operating in the server apparatus 200. The client apparatus 300 processes by itself an input received from the application window 315. By contrast, the client apparatus 300 transmits an input received from the application window 215 to the server apparatus 200 and causes the server apparatus 200 to process the input.

The information processing system 10 shown in FIG. 1 is called as SBC (server-based computing). In the information processing system 10, it is not necessary to transmit data stored in the server apparatus 200 to the client apparatus 300, but sufficient to transmit only display screen data. Therefore, the information processing system 10 is considered to be effective in preventing the information leakage. On the other hand, a clipboard function for causing the server apparatus 200 and the client apparatus 300 to share information has been also proposed for the SBC, in order to enhance convenience of a user. Upon receipt of an instruction to copy data from a user via the application window 215, this function makes it possible that the server apparatus 200 writes the data stored in the server apparatus 200 into a virtual clipboard. Additionally, upon receipt of an instruction to paste data from the user via the application window 315, the client apparatus 300 reads out the data from the clipboard, and makes the data available for use in the client apparatus 300.

The above-mentioned clipboard function enables readout of data from the server apparatus 200, and thereby, has a possibility of being used for an unauthorized acquisition of the data. An object of the information processing system 10 according to the embodiment of the present invention is to effectively prevent the information leakage by making various functions available only to an authorized client apparatus, the various functions having a possibility of being inappropriately used in the SBC, as described above. Functions for achieving this object will be described in a first example of the embodiment. Furthermore, functions for control so as to prohibit a user from storing even a display image on a screen in the client apparatus 300 will be described in second and third examples of the embodiment.

Figure 2:
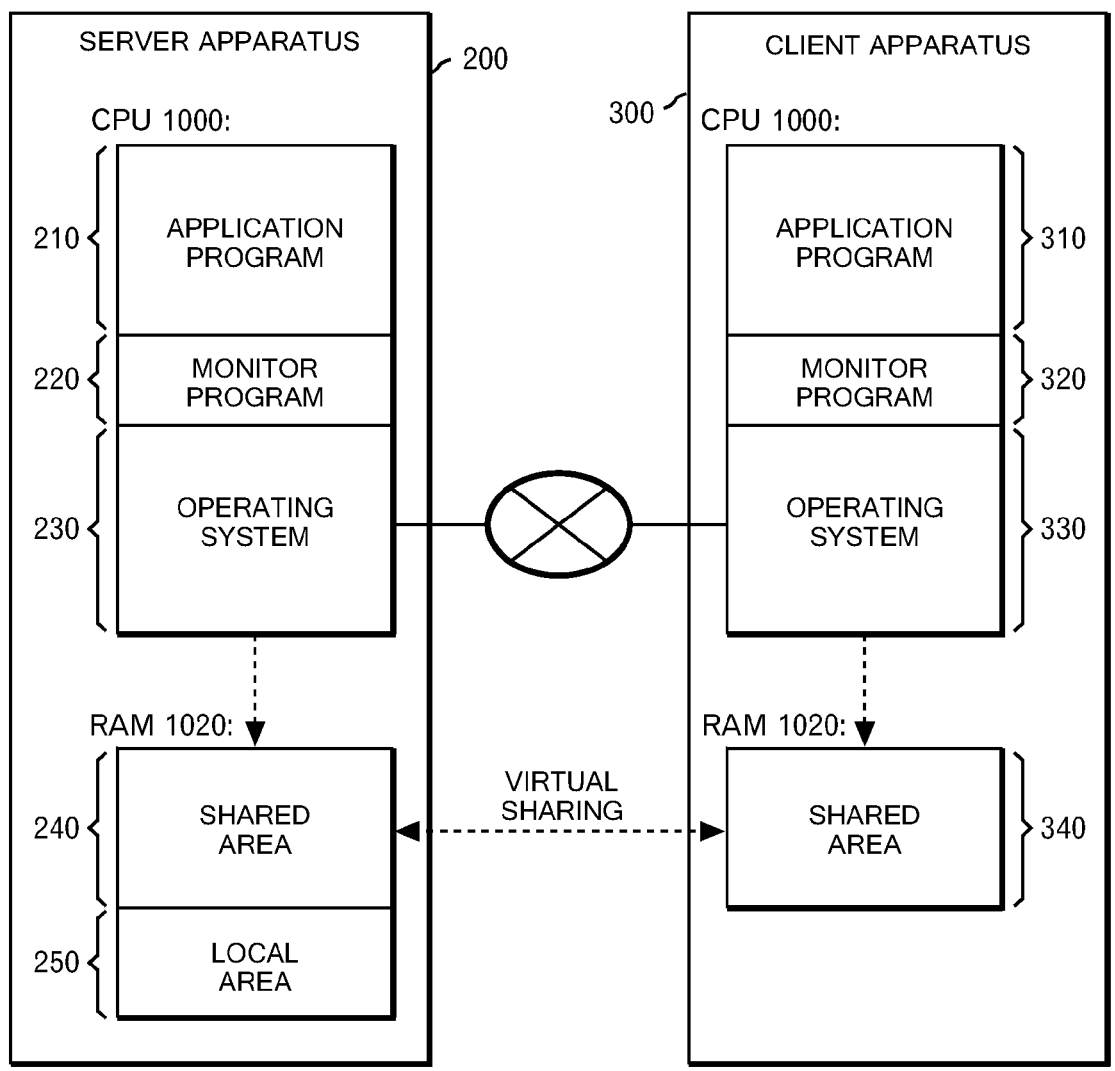
FIG. 2 shows a functional configuration of the information processing system 10 in a first example.

FIG. 2 shows a functional configuration of the information processing system 10 in the first example. The information processing system 10 includes the server apparatus 200 and the client apparatus 300. The server apparatus 200 has various kinds of hardware needed to cause the server apparatus 200 to function as an information processing apparatus. FIG. 2 shows programs operating in the server apparatus 200 by using a CPU 1000 and a RAM 1020 among the above-mentioned kinds of hardware. Similarly, the client apparatus 300 includes another CPU 1000 and another RAM 1020. FIG. 2 also shows programs operating in the client apparatus 300 by using the above hardware.

The server apparatus 200 executing an application program 210, a monitor program 220 and an operating system 230. The client apparatus 300 executes an application program 310, a monitor program 320 and an operating system 330. Here, each of the operating system 230 and the operating system 330 includes not only a program, which is so-called a kernel, for providing basic functions of the operating system, but also a service program for providing various functions to an application program, and various kinds of middleware for supporting operation of the application program.

The server apparatus 200 includes a shared area 240 in the RAM 1020. The shared area 240 is used for sharing information between the application program 210 operating in the server apparatus 200 and the application program 310 operating in the client apparatus 300. Meanwhile, the client apparatus 300 includes a shared area 340 in the RAM 1020. The shared area 340 is used for sharing information between the application programs 210 and 310. That is, for example, the shared areas 240 and 340 are managed, as virtual areas for sharing the information, respectively by the service programs in the operating systems 230 and 330. More specifically, data written in the shared area 240 are immediately transmitted to the client apparatus 300, and then written in the shared area 340. Likewise, data written in the shared area 340 are immediately transmitted to the server apparatus 200, and then written in the shared area 240.

The server apparatus 200 further includes a local area 250 in the RAM 1020. The local area 250 is accessible from the server apparatus 200 and inaccessible from the client apparatus 300. Note that the shared area 240, the local area 250 and the shared area 340 which have been presented hereinabove may be implemented not only by the respective RAMs 1020 but also by various recording media such as a hard disk drive.

Figure 3:
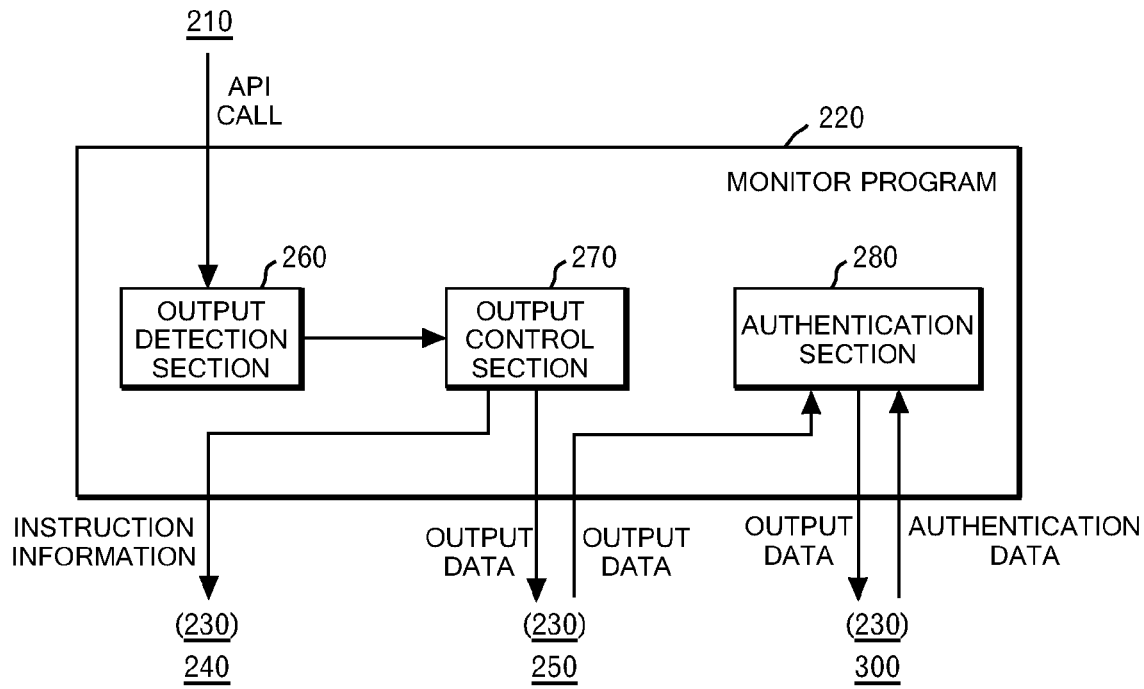
FIG. 3 shows a configuration of each of functions realized by a monitor program 220 of the first example.

FIG. 3 shows a configuration of each of functions realized by the monitor program 220 of the first example. The monitor program 220 causes the CPU 1000 to function as an output detection section 260, an output control section 270 and an authentication section 280. The output detection section 260 detects output-processing which is processing of outputting data from the application program 210 into the shared area 240. Specifically, the output detection section 260 detects, as the output-processing, a predetermined API (application programming interface) call from the application program 210 to the operating system 230. What is called by this API call is the service program provided by the operating system 230 in order to realize a function of outputting the data into the shared area 240.

In response to a detection of the output-processing, the output control section 270 stores instruction information in the shared area 240, instead of storing output data outputted from the application program 210 therein. Here, the instruction information specifies an acquisition method by which the authorized client apparatus 300 acquires the output data. Specifically, by use of a function of the operating system 230, the output control section 270 modifies the output data stored in the shared area 240 into the instruction information, by changing an argument parameter of the detected API call and the like. This instruction information may include authentication data for authenticating the client apparatus 300 as an authorized client apparatus. Additionally, the output control section 270 stores the output data in the local area 250. Moreover, the output control section 270 may delete the output data from the local area 250 in a case where an unauthorized access is detected. The authentication section 280 receives the authentication data from the reading control section 370 in the client apparatus 300, in association with a request for acquiring the output data. In response to this, the authentication section 280 authenticates the client apparatus 300 based on this authentication data. On condition that the authentication is succeeded, the authentication section 280 reads the output data from the local area 250, and transmits the output data to the client apparatus 300.

Figure 4:
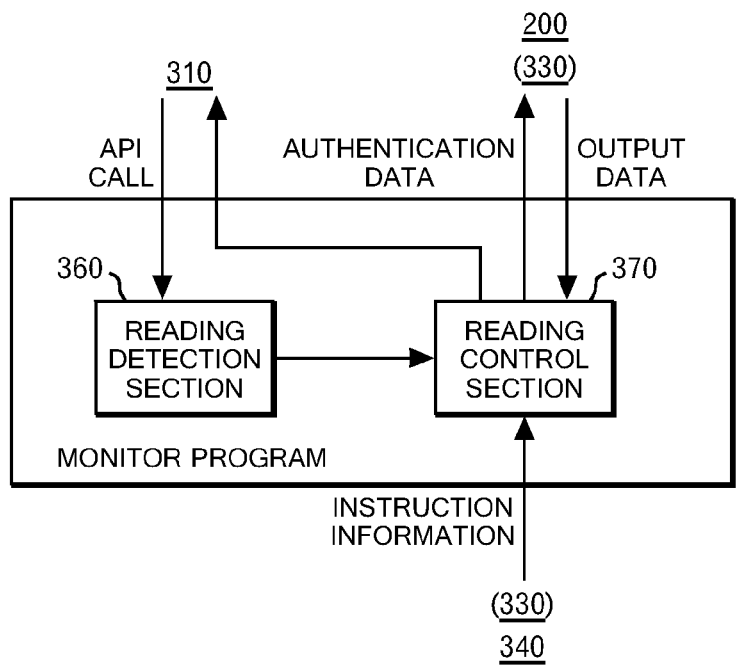
FIG. 4 shows a configuration of each of functions realized by a monitor program 320 of the first example.

FIG. 4 shows a configuration of each of functions realized by the monitor program 320 of the first example. The monitor program 320 causes the CPU 1000 to function as a reading detection section 360 and a reading control section 370. The reading detection section 360 detects reading-processing which is processing of reading data from the shared area 340. Specifically, the reading detection section 360 detects, as the reading-processing, a predetermined API call from the application program 310 to the operating system 330. In response to the detection of this reading-processing, the reading control section 370 reads the instruction information from the shared area 340, and then, acquires the output data from the server apparatus 200 in the acquisition method specified by the instruction information. For example, the reading control section 370 may identify the server apparatus 200 based on an IP address specified by the instruction information, and transmit the request for acquiring the output data to the server apparatus 200. In addition to this, the reading control section 370 may transmit, to the server apparatus 200, the authentication data for authenticating the client apparatus 300 as an authorized client apparatus.

Figures 5, 6:
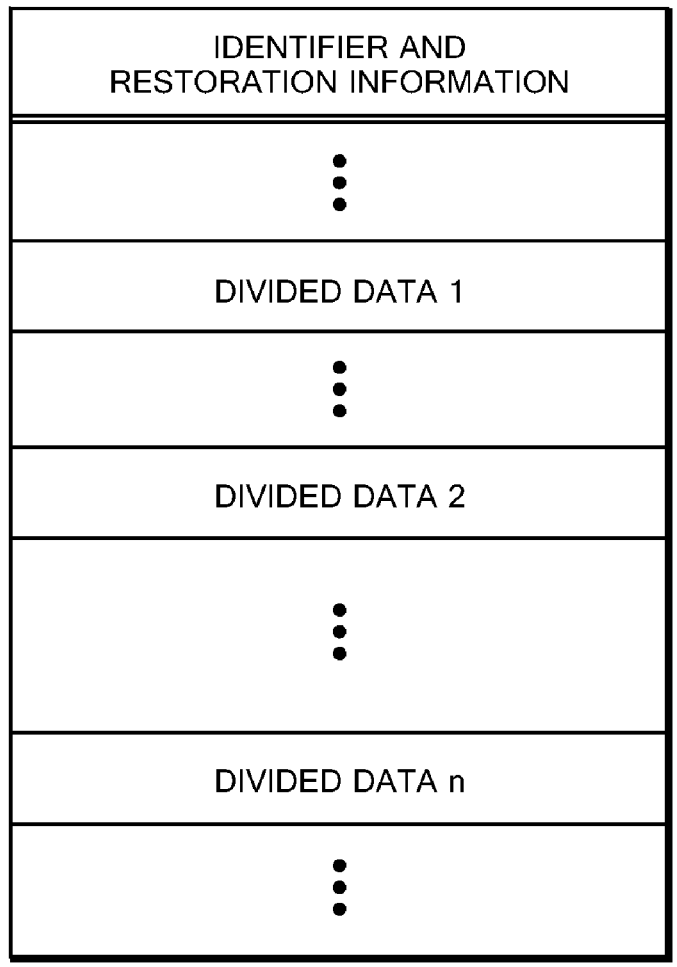
FIG. 5 shows an example of a data structure of a shared area 240 of the first example.
FIG. 6 shows another example of the data structure of a shared area 240 of the first example.

FIG. 5 shows an example of a data structure of the shared area 240 of the first example. As described above, the instruction information stored in the shared area 240 specifies the acquisition method by which the client apparatus 300 acquires the output data. This instruction information specifically includes: the IP address of the server apparatus 200; a port number to be accessed in order to acquire the output data from the local area 250 of the server apparatus 200; and a password used for authenticating the client apparatus 300 as an authorized client apparatus. This instruction information makes it possible that the reading control section 370 accesses the server apparatus 200 based on this instruction information, that the client apparatus 300 is authenticated as an authorized apparatus, and that the output data is acquired.

FIG. 6 shows another example of the data structure of the shared area 240 of the first example. In this example, the shared area 240 stores not only the instruction information but also the output data itself. To be more precise, the output control section 270 in this example does not store the output data in the local area 250, but stores, in the shared area 240, data which is obtained by converting the output data into data in a form restorable in an authorized client apparatus. In the example of FIG. 6, by means of the output control section 270, the output data is encrypted, is divided into a plurality of divided data (divided data 1 to n), and is stored in the shared area 240 in a dispersed manner.

Additionally, the output control section 270 stores restoration information in the shared area 240, as the instruction information. The restoration information specifies a method of decrypting this converted output data. This restoration information includes a decrypting key for decrypting the encrypted output data and information for restoring the output data from the plurality of divided data. Furthermore, this instruction information includes an identifier indicating that data stored in the shared area 240 is not the output data but the instruction information. Thereby, even if a client apparatus incapable of interpreting a meaning of this identifier can read any data from the shared area 240, the client apparatus cannot restore output data. On the other hand, an authorized client apparatus can adequately restore the original output data by appropriately allocating processing based on the identifier, in a case either where the output data itself is stored in the shared area 240, or where the instruction information is stored therein.

Note that, even in a case where the output data are encrypted, the output control section 270 may not store the decrypting key as the restoration information in the shared area 240. In this case, the client apparatus 300 decrypts this output data by use of the decrypting key previously stored in the RAM 1020 or the like of the client apparatus 300. That is, this decrypting key may be previously transmitted to the client apparatus 300 from the server apparatus 200 without using the shared area 240.

Hereinbelow, descriptions will be given of processing flows of three applied examples to which the first example is applied.

Figure 7:
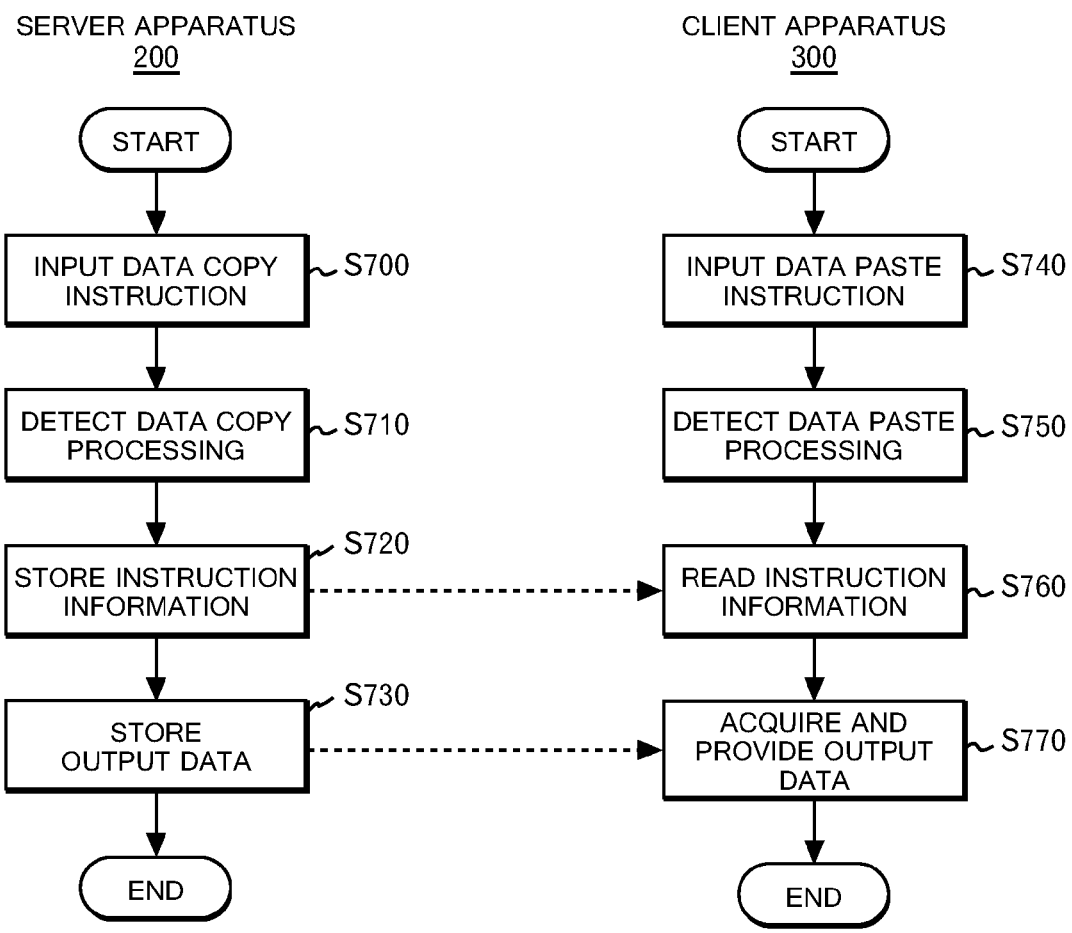
FIG. 7 shows a processing flow of a first applied example of the first example.

FIG. 7 shows a processing flow of a first applied example of the first example. An object of the first applied example is to prevent the information leakage via a clipboard provided as a function of the SBC. The server apparatus 200 receives an input of a data copy instruction which causes data displayed by the application program 210 to be outputted into the shared area 240 (S700). This data copy instruction may be inputted to the application window 215 in the display section 305, and transmitted to the server apparatus 200 through a communication network. Then, the output detection section 260 detects, as the output-processing, data-copy-processing in response to this data copy instruction (S710). In a case where the operating system 230 is Windows (registered trademark), the output detection section 260 may specifically detect an API call which is "SetClipboardData" as the output-processing.

This data-copy-processing is an instruction for outputting the data displayed by the application program 210 into the shared area 240, as internal processing data different from a displayed data image. To be more precise, the internal processing data is not image data showing shapes of displayed letters, but text data in which identifiers of letters constituting a character string are arranged. Such internal processing data is relatively easily reused as compared with the displayed image, and is more likely to be abused when the data is taken out by an unauthorized client apparatus.

For this reason, the output control section 270 stores, in the shared area 240, the instruction information specifying an acquisition method, instead of storing the output data itself outputted by data-copy-processing (S720) therein. In addition, the output control section 270 stores this output data in the local area 250, or stores, in the shared area 240, data obtained by converting this output data (S730). Accordingly, it becomes possible to cause an unauthorized client apparatus to read the instruction information as the output data, and thus to prohibit the unauthorized client apparatus from correctly acquiring the original output data.

The application program 310 reads the internal processing data from the shared area 340, and receives a data paste instruction from the user (S740). In response to the data paste instruction, the data is controlled so as to be editable from the application program 310 of the client apparatus 300. The reading detection section 360 detects, as the reading processing, data-paste-processing in response to this data paste instruction (S750). In a case where the operating system 330 is Windows (registered trademark), the output detection section 260 may specifically detect an API call which is "GetClipboardData", as the reading-processing. In response to the detection of the reading-processing, the reading control section 370 reads the data from the shared area 340 (S760).

On condition that this read data includes an identifier indicating that this data is the instruction information, the reading control section 370 acquires the output data in the acquisition method specified by the instruction information (S770). For example, the reading control section 370 may decrypt the encrypted output data with the decrypting key being read as the instruction information, or may connect the plurality of divided data to one another based on the restoration information being read as the instruction information. This makes it possible to make the output data usable by the application program 310, and to cause an authorized client apparatus to adequately acquire information from the server apparatus.

As mentioned hereinabove, with the first applied example, an unauthorized client apparatus can be prohibited from using the virtual clipboard, whereby preventing data in the server apparatus 200 from leaking in the editable form.

Figure 8:
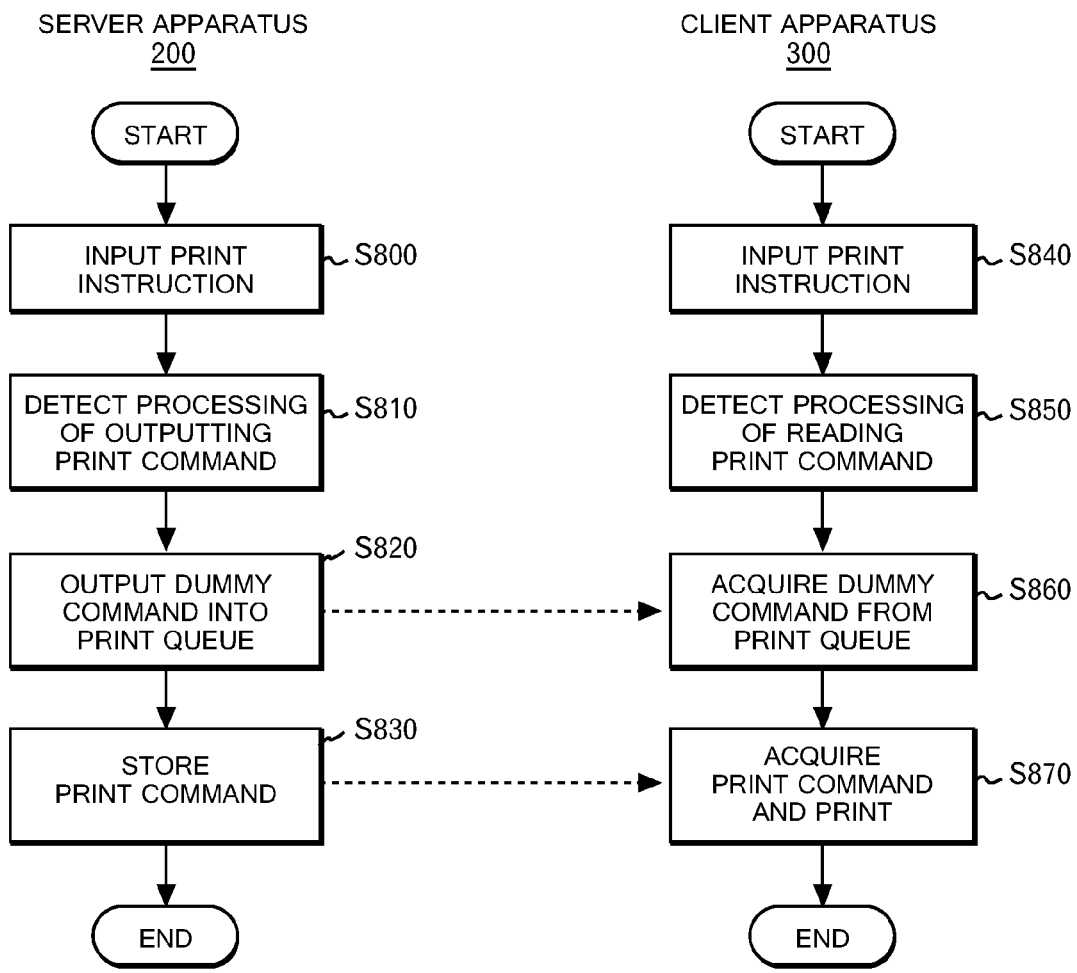
FIG. 8 shows a processing flow of a second applied example of the first example.

FIG. 8 shows a processing flow of a second applied example of the first example. In the SBC, provided is a function of printing information in the server apparatus 200 by a printer connected to the client apparatus 300. That is, in the applied second example, the shared area 240 is an area (a storage area is referred as so-called a print queue or a printer spool) for storing a print command to cause the printer to print the information. The print command in this area is also synchronized with the shared area 340 by means of a function of the SBC as in the case with the clipboard. Then, the print command stored in the shared area 340 is transmitted to the printer connected to the client apparatus 300, thereby being used for print processing. An object of the applied second example is to prevent the information leakage cause by use of the print function as described above.

The application program 210 receives an input of a print instruction (S800). In the client apparatus 300, this print instruction is, for example, an instruction inputted to the application window 215 by the user. The output detection section 260 detects, as the output-processing, processing of outputting a predetermined print command into the shared area 240 (S810). This print command is a command for causing a printer accessible from the client apparatus 300 to print data displayed by the application program 210. In response to the detection of the output-processing, the output control section 270 outputs a dummy command into the shared area 240 which is a print queue (S820). The dummy command is different from the print command, and includes instruction information specifying a method of acquiring the print command. Then, the output control section 270 stores the print command in the local area 250, or divides the print command to be stored in the shared area 240 (S830). In a case of dividing the print command, a plurality of virtual print queues may be provided in advance, and the divided pieces of the print command may be outputted respectively into the virtual print queues.

Here, in S820, it is not desirable that the dummy command include output data outputted from the server apparatus 200, but it is desirable that the dummy command adhere to a print command format. Thereby, a conventional print program can be used as a program for reading the command in the client apparatus 300, whereby a cost in program development can be reduced.

In the client apparatus 300, the application program 310 receives an input of the print instruction (S840). The reading detection section 360 detects, as the abovementioned reading-processing, processing of reading a predetermined print command from the shared area 340 (S850). This print command is a command for causing a printer accessible from the client apparatus 300 to print the data displayed by the application program 210. In response to the detection of the reading-processing, the reading control section 370 reads the dummy command from the shared area 340 (S860). Then, the reading control section 370 acquires the print command in the acquisition method specified by the instruction information included in the dummy command, and makes the print command usable by the application program 310 (S870).

As described hereinabove, with the second applied example, an unauthorized client apparatus is prohibited from using the print function, whereby preventing the information leakage caused by use of printing data stored in the server apparatus 200.

Figure 9:
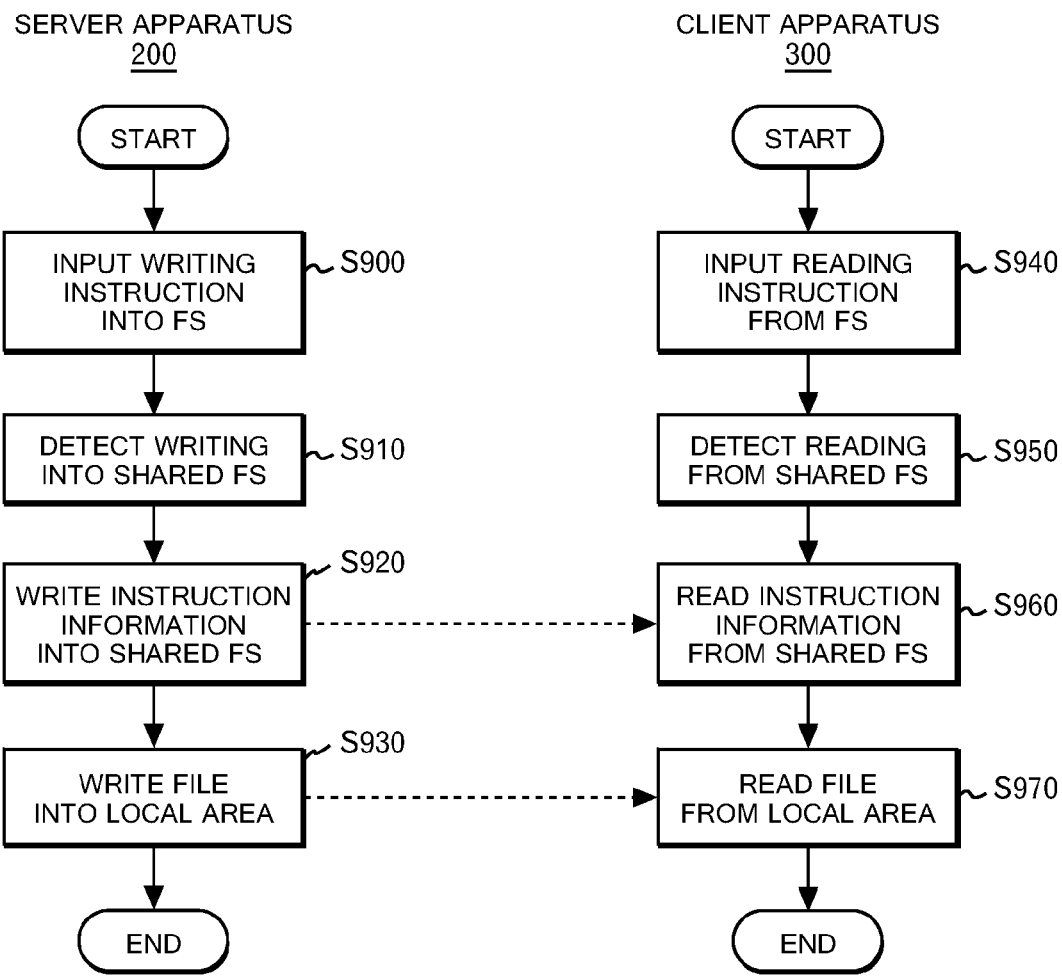
FIG. 9 shows a processing flow of a third applied example of the first example.

FIG. 9 shows a processing flow of a third applied example of the first example. An object of the third applied example is to prevent the information leakage caused by use of a function of sharing a part of a file system among a plurality of information processing apparatuses. In the third applied example, the shared areas 240 and 340 are areas managed by a file system (FS) of the client apparatus 300, and mounted as the part of the file system of the client apparatus 300 so that the areas can be accessed by the server apparatus 200. Hereinafter, each of these areas is referred to as a shared FS.

The application program 210 receives a write instruction of a file into the file system (S900). The write instructions include instructions not only for newly producing a file in the file system, but also for changing a file already stored in the file system. Then, on condition that a target path which is designated for writing in the FS of the server apparatus 200 by the application program 210 is the shared FS, the output detection section 260 detects writing in this file system as the output-processing (S910).

In response to the detection of the output-processing, the output control section 270 writes the instruction information specifying a method of acquiring this file into this shared FS, instead of writing a newly produced or updated file (S920). Then, the output control section 270 writes this file into the local area 250 (S930).

In the client apparatus 300, the application program 310 receives an input of an instruction for reading a file from the file system (S940). Then, the reading detection section 360 detects this reading as the abovementioned reading-processing, on condition that the file to be targeted for readout in the shared FS is a file storing the instruction information (S950). In response to the detection of the reading-processing, the reading control section 370 reads, from this file in the shared FS, the instruction information specifying the method of acquiring a file in which the normal output data is stored (S960). Then, the reading control section 370 reads this file from the local area 250 in this specified acquisition method (S970). Thereby, this file is managed so as to be available for the application program 310.

As described hereinabove, according to the third applied example, an unauthorized client apparatus is prohibited from using the function of sharing the file system, whereby preventing leakage of data in the server apparatus 200.

Figure 10:
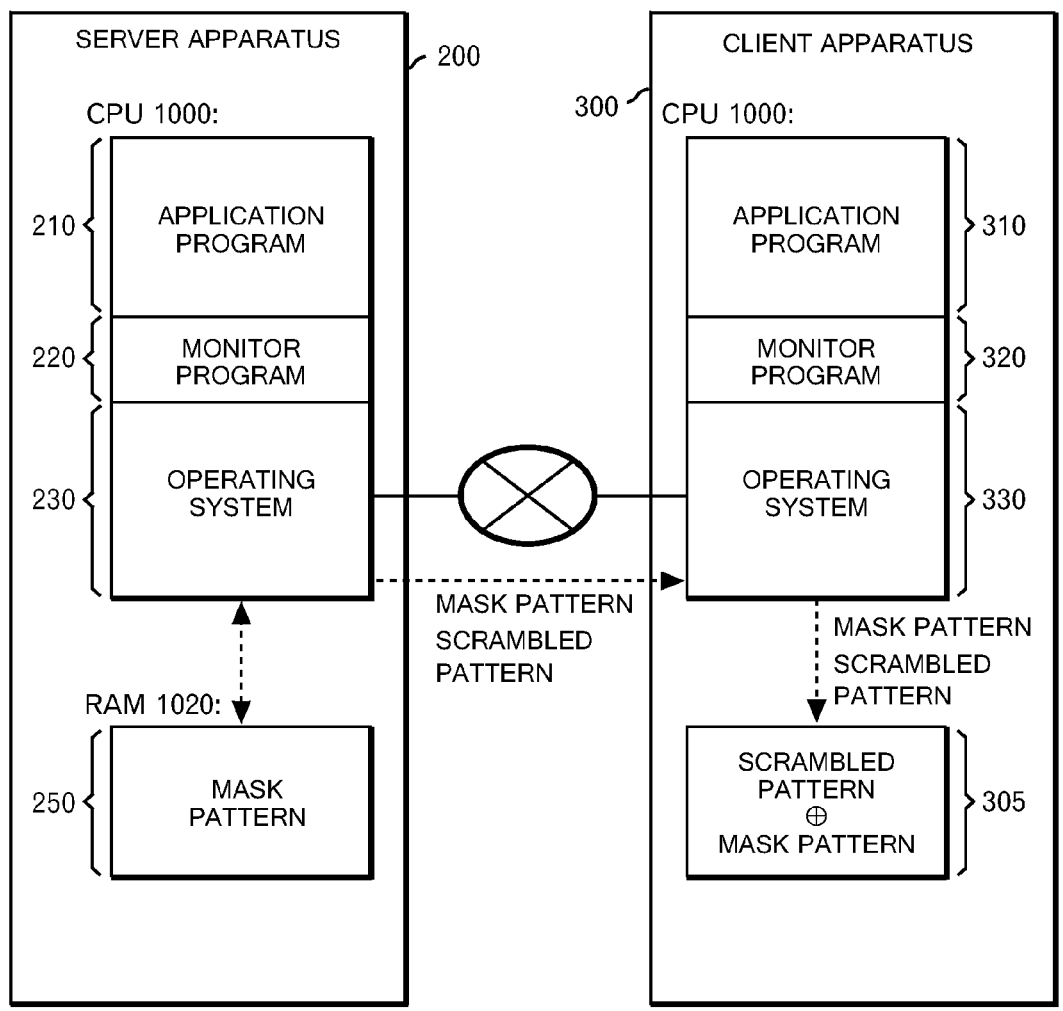
FIG. 10 shows an entire configuration of the information processing system 10 in the second example.

FIG. 10 shows an entire configuration of an information processing system 10 in a second example. An object of the second example is to prevent data stored in the server apparatus 200 from leaking out not only in an easy-to-use form such as a text-data form, but also in a display screen image form. The information processing system 10 in the second example, as in the case with the first example, includes a server apparatus 200 and a client apparatus 300. The server apparatus 200 executes an application program 210, a monitor program 220 and an operating system 230 by use of a CPU 1000. Furthermore, the server apparatus 200 includes a local area 250 in a RAM 1020. The client apparatus 300 executes an application program 310, a monitor program 320 and an operating system 330, and includes a display section 305. As in the case with the first example, the client apparatus 300 displays an output of the application program 210 on the screen in the display section 305.

Figure 11:
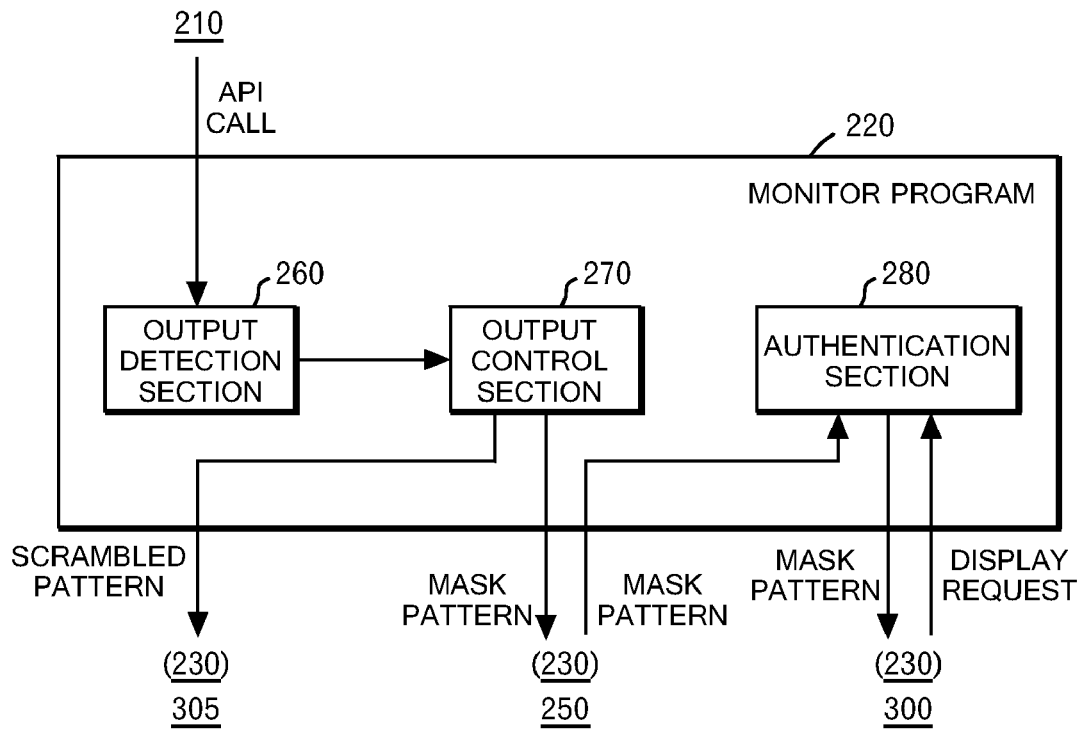
FIG. 11 shows a configuration of each of functions realized by the monitor program 220 of the second example.

FIG. 11 shows a configuration of each of functions realized by the monitor program 220 of the second example. The monitor program 220 causes the CPU 1000 to function as an output detection section 260, an output control section 270 and an authentication section 280. By use of the application program 210, the output detection section 260 detects output-processing which is processing of outputting, into the client apparatus 300, display data to be displayed on a screen of the client apparatus 300. This output-processing is, specifically, an API call to the operating system 230 from the application program 210. In response to the detection of this output-processing, the output control section 270 generates a scrambled pattern by masking the display data, which is to be displayed by the application program 210, with a predetermined mask pattern. The mask pattern, for example, is a random pattern based on predetermined random numbers. Meanwhile, the scrambled pattern is a pattern in which exclusive ORs each of each piece of pixel data of the display data and each piece of pixel data of the random pattern are arrayed.

In addition, the output control section 270 stores this mask pattern in the local area 250. Moreover, the output control section 270 transmits this scrambled pattern to the client apparatus 300, instead of transmitting this display data, so as to cause the display section 305 to display this scrambled pattern. Processing of transmitting the scrambled pattern and causing the scrambled pattern to be displayed can be realized by a conventional known technique. For example, with each of communication protocols respectively called RDP and ICA, a display screen image can be transmitted and received between information processing apparatuses. In response to a screen display request received from the client apparatus 300, the authentication section 280 reads the mask pattern from the local area 250, and transmits the mask pattern to the client apparatus 300.

Figure 12:
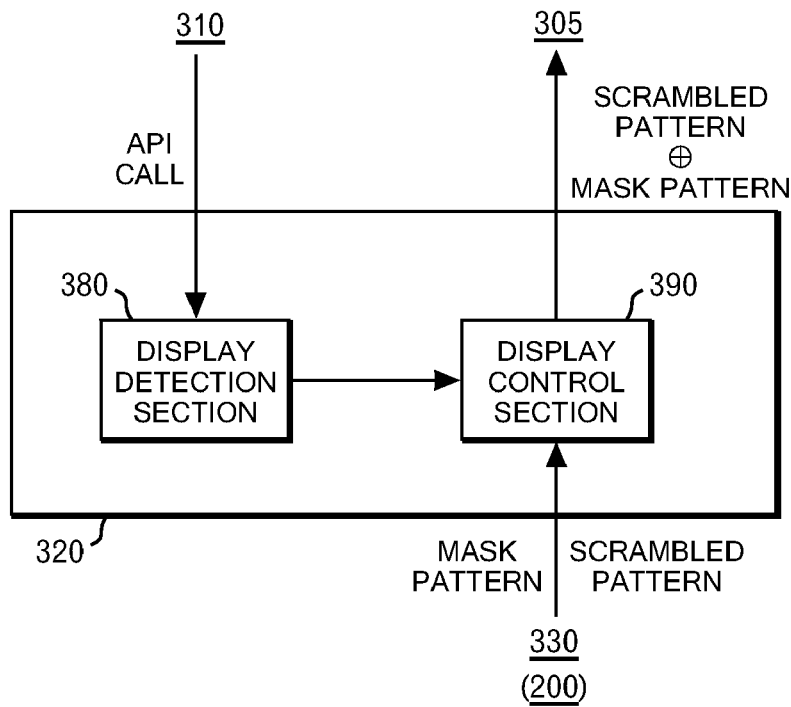
FIG. 12 shows a configuration of each of functions realized by the monitor program 320 of the second example.

FIG. 12 shows a configuration of each of functions realized by the monitor program 320 of the second example. The monitor program 320 causes the CPU 1000 to function as a display detection section 380 and a display control section 390. The display detection section 380 detects display-processing of displaying the display data (the scrambled pattern, in the case of this example) received from the server apparatus 200. In addition, in response to the detection of the display-processing, the display control section 390 transmits the screen display request to the server apparatus 200, and acquires the mask pattern from the server apparatus 200. Moreover, the display control section 390 restores the original display data from the scrambled pattern by use of the mask pattern so as to display the original display data. For example, the display control section 390 may display, as the original display data, a pattern in which exclusive ORs each of each piece of pixel data of the mask pattern and each piece of pixel data of the scrambled pattern are arrayed. This exclusive OR operation may be realized by inputting the pixel data into a higher buffer in the Z-order provided for displaying a certain display object in a manner transparently overlaid with another display object.

As described hereinabove, with the second example, a client apparatus which does not perform overlay processing of the mask pattern is prohibited from displaying a normal screen image, whereby preventing display data from being taken out illegally.

Figure 13:
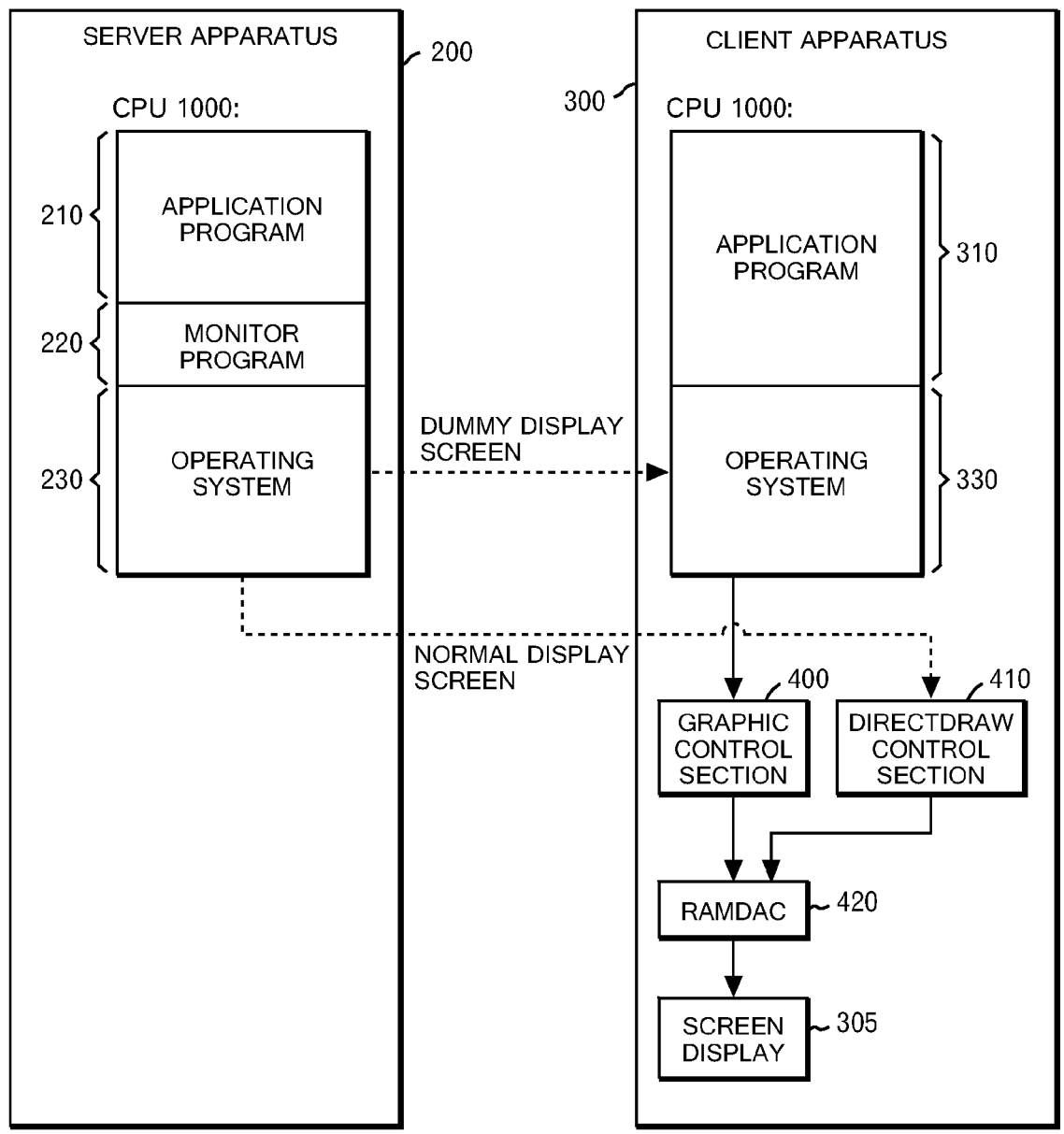
FIG. 13 shows an entire configuration of the information processing system 10 in the third example.

FIG. 13 shows an entire configuration of the information processing system 10 in the third example. An object of the third example is the same as the object of the second example. That is, the third example aims at preventing data stored in a server apparatus 200 from leaking out not only in an easy-to-use form such as a text-data form, but also in a screen display image form. In addition to this, the third example further aims at enhancing compatibility with already widespread information processing systems by making it unnecessary that an authorized client apparatus executes a program such as a monitor program 320. Specifically, a conventional operating system has a function of storing a display screen image in a storage device (referred to as so-called "PrintScreen" or the like). By using this function, a display screen image displayed in a client apparatus 300 has a risk of being illegally taken out through a storage device of the client apparatus 300 even if the image is displayed by following an instruction from the server apparatus. The third example aims at preventing the information leakage by displaying a screen in a manner that the screen cannot be acquired by a function such as "PrintScreen".

The information processing system 10 includes the server apparatus 200 and the client apparatus 300. The server apparatus 200 executes an application program 210, the monitor program 220 and an operating system 230 by use of a CPU 1000. The client apparatus 300 executes an application program 310 and an operating system 330 by use of a CPU 1000. The client apparatus 300 does not need to execute the monitor program 320. Additionally, the client apparatus 300 includes a display section 305, a graphic control section 400, a DirectDraw control section 410 and a RAMDAC 420. The graphic control section 400 converts display data received from the server apparatus 200 into signals transmittable to the display section, and stores the signals in an on-screen buffer (a buffer for a main screen) of a video RAM. Moreover, without depending on the graphic control section 400, the DirectDraw control section 410 stores the display data received from the server apparatus 200, in an off-screen buffer (a buffer for an overlaid screen) of the video RAM. Note that each of the functions of the graphic control section 400 and the DirectDraw control section 410 may be implemented by a graphics chip, and that a part of those functions may be implemented by software. The RAMDAC 420 transfers the display data located on the video RAM to the display section 305. Additionally, the RAMDAC 420 functions as a composition processing section in the third example of the present invention. That is, the RAMDAC 420 realizes display in the display section 305 by composing the display data stored in the on-screen buffer and the display data stored in the off-screen buffer, and by transferring the composed display data to the display section 305.

Figure 14:
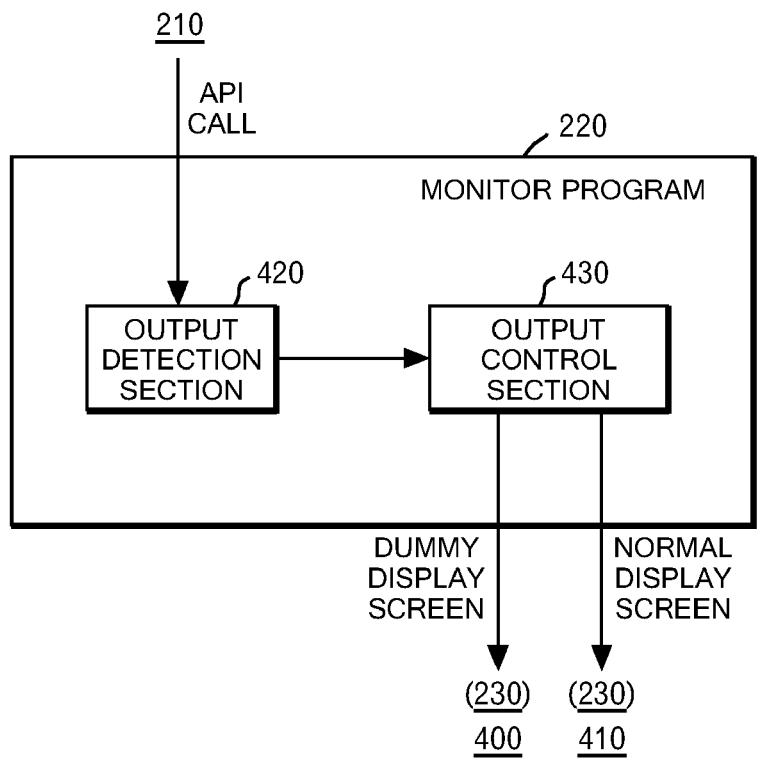
FIG. 14 shows a configuration of each of functions realized by the monitor program 220 of the third example.

FIG. 14 shows a configuration of each of functions realized by the monitor program 220 of the third example. The monitor program 220 causes the CPU 1000 to function as an output detection section 420 and an output control section 430. The output detection section 420 detects output-processing which is processing of outputting, into the graphics chip 400, display data displayed on the screen of the client apparatus 300 by the application program 210. In response to the detection of this output-processing, the display data is converted into signals transmittable to the display section 305. In addition, the output control section 430 transmits this converted signal data to the DirectDraw control section 410, instead of transmitting the display data outputted to the graphic chip 400. In this case, the output control section 430 may output, into the graphic chip 400, display data (referred to as, for example, dummy display data) unrelated to the foregoing display data.

As a result, a screen based on the dummy display data is displayed by the graphic chip 400, while a normal display screen is displayed by the DirectDraw control section 410. Since conventional functions, such as "PrintScreen", target display screens under the control of an operating system, with these functions, only dummy display data is acquired and a normal display screen is not acquired. Thus, according to the third example, leakage of display screen data can be prevented without using a special program such as the monitor program 320.

Figure 15:
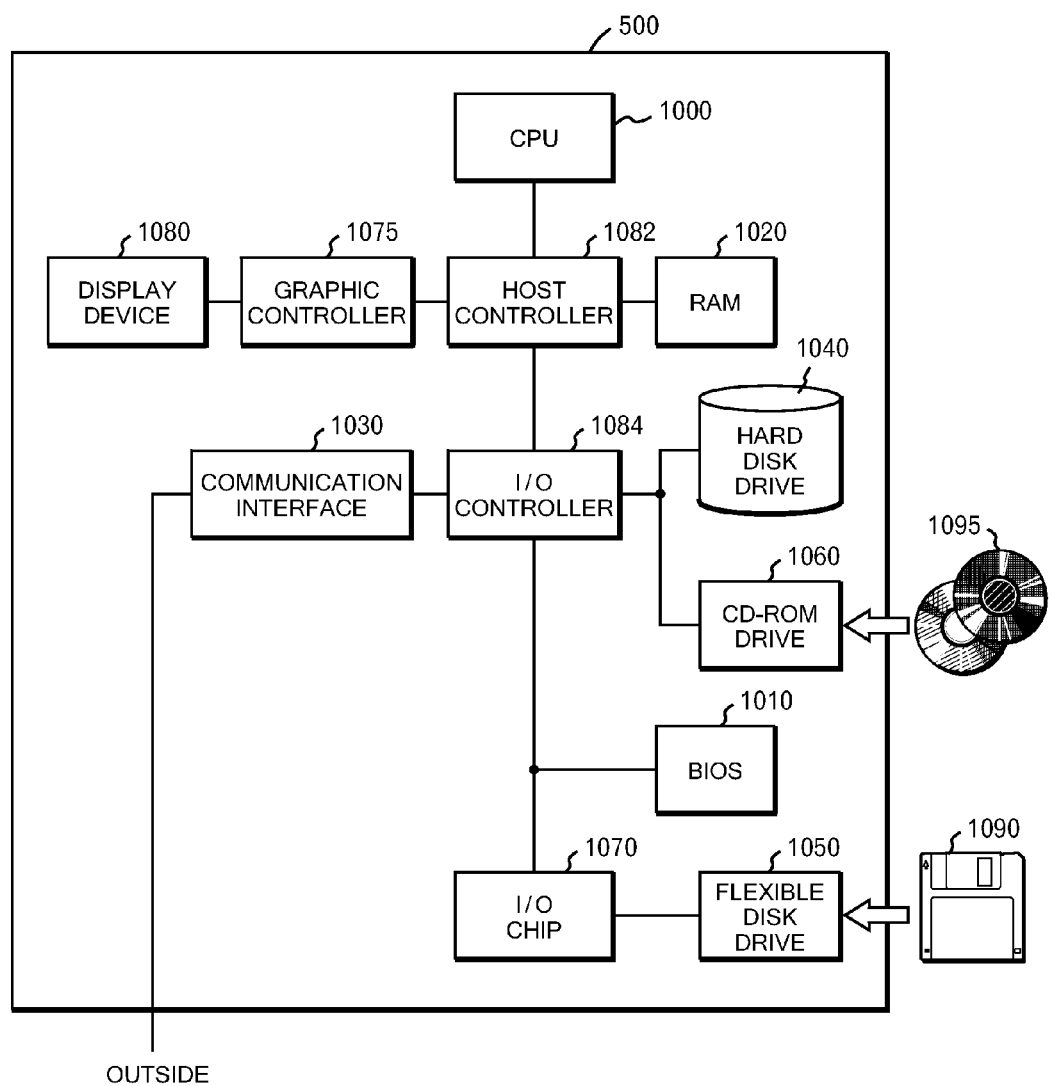
FIG. 15 shows an example of hardware configuration of an information processing apparatus 500 functioning as the server apparatus 200 or the client apparatus 300 in the above examples.

FIG. 15 shows an example of a hardware configuration of an information processing apparatus 500 functioning as the server apparatus 200 or the client apparatus 300 in each of the abovementioned examples. The information processing apparatus 500 includes: a CPU peripheral section having the CPU 1000, the RAM 1020, and a graphic controller 1075 which are mutually connected by the host controller 1082; an I/O section having a communication interface (IF) 1030, a hard disk drive 1040, and a CD-ROM drive 1060, which are connected to the host controller 1084 via an I/O controller 1084; and a legacy I/O section having a BIOS 1010, a flexible disk drive 1050, and an I/O chip 1070, which are connected to the I/O controller 1084.

The host controller 1082 mutually connects the RAM 1020 to the CPU 1000 and the graphic controller 1075, which access the RAM 1020 at a high transfer rate. The CPU 1000 operates based on the programs stored in the BIOS 1010 and RAM 1020 so as to make a control over each of the sections. The graphic controller 1075 acquires image data which the CPU 1000 or the like generates on a frame buffer provided in the RAM 1020. Thereby, the graphic controller 1075 displays the image data on a display section 1080. Instead of this, the graphic controller 1075 may include a frame buffer storing the image data generated by the CPU 1000 or the like, therein. The display section 1080 in FIG. 15 functions as, for example, the display section 305 shown in FIG. 1. Additionally, the graphic controller 1075 in FIG. 15 functions as, for example, the graphics chip 400 shown in FIG. 13.

The I/O controller 1084 connects the host controller 1082 to the communication interface 1030, the hard disk drive 1040 and the CD-ROM drive 1060, which are relatively high speed I/O devices. The communication interface 1030 communicates with an external device through a network. The hard disk drive 1040 stores programs and data used by the information processing apparatus 500. The CD-ROM drive 1060 reads a program or data from a CD-ROM 1095, and provides the program or the data to the RAM 1020 or the hard disk drive 1040.

Furthermore, the BIOS 1010 as well as relatively low speed I/O devices such as the flexible disk drive 1050 and the I/O chip 1070 are connected to the I/O controller 1084. The BIOS 1010 stores a boot program executed by the CPU 1000 when the information processing apparatus 500 is started, other programs dependent on hardware of the information processing apparatus 500, and the like. The flexible disk drive 1050 reads a program or data from a flexible disk 1090, and provides the program or the data to the RAM 1020 or to the hard disk drive 1040 through the I/O chip 1070. The flexible disk 1090 and various kinds of I/O devices are connected to the I/O chip 1070, and the latter I/O devices are connected thereto respectively through, for example, a parallel port, a serial port, a keyboard port, a mouse port and the like.

The information processing apparatus 500 is provided, by a user, with a program stored in a recording medium such as the flexible disk 1090, the CD-ROM 1095 or an IC card. The program is read from the recording medium, and then, is installed in the information processing apparatus 500 through the I/O chip 1070 and/or I/O controller 1084, so as to be executed therein. A description on operations which the program causes the information processing apparatus 500 to perform is omitted here, because these operations are identical to those in the server apparatus 200 or the client apparatus 300 which have been described with reference to FIGS. 1 to 14.

The above-mentioned program may be stored in an external recording medium. As the recording medium, apart from the flexible disk 1090 and the CD-ROM 1095, it is possible to use an optical recording medium such as DVD or PD, a magneto optical recording medium such as MD, a tape medium, a semiconductor memory such as IC card, or the like. Additionally, it is also possible to use, as the recording medium, a recording device such as a hard disk, a RAM or the like, which are provided in a server system connected to a private communication network or the Internet so as to provide the program to the information processing apparatus 500 through the network.

Figure 16:
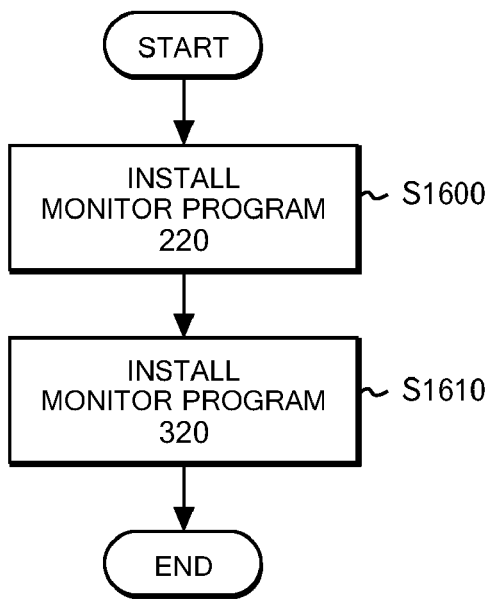
FIG. 16 shows a processing flow for implementing functions of the server apparatus 200, and the functions of the client apparatus 300, respectively, into a plurality of information processing apparatuses.

FIG. 16 shows a processing flow for implementing the functions of the server apparatus 200 and those of the client apparatus 300, respectively, in a plurality of information processing apparatuses. Referring to FIG. 16, a description will be given of a method of implementing the functions of the server apparatus 200 and those of the client apparatus 300, which have been described in the first example or the like, respectively in a plurality of information processing apparatuses 500, after installation of the plurality of information processing apparatuses 500 illustrated in FIG. 15. Note that the description will be given assuming that the operating system and the application program have already been installed in these information processing apparatuses, and that these information processing apparatuses are connected to one another via a communication line.

A service engineer installs the monitor program 220 in a first information processing apparatus 500 (S1600). That is, the service engineer implements at least anyone of the function of the output detection section 260, that of the output control section 270 and that of the authentication section 280 in this information processing apparatus. Next, the service engineer installs the monitor program 320 in a second information processing apparatus 500 (S1610). That is, the service engineer implements at least any of the function of the reading detection section 360 and that of the reading control section 370 in this information processing apparatus.

By the abovementioned processing, the service engineer can cause a system consisting of a plurality of normal information processing apparatuses to function as the information processing system 10 of the abovementioned embodiment.

According to the present invention, it is possible to effectively prevent information leakage from the server apparatus.

Although the present invention has been described hereinabove by using the embodiment, a technical scope of the present invention is not limited to the scope described in the above embodiment. It is obvious to those skilled in the art that various changes or modifications can be added to the above embodiment. It is obvious from descriptions in the scope of claims that a thus changed or modified embodiment can also be included in the technical scope of the present invention.

What is claimed is:

1. A system including a server apparatus, an application program and a client apparatus enabling a user to utilize the application program by communicating with the server apparatus based on an instruction of the user,
the system wherein the server apparatus comprises;
at least one computer processing device;
an output detection section for detecting output-processing which is processing of outputting data from the application program into a shared area having information shared between the server apparatus and the client apparatus; and
an output control section for storing instruction information in the shared area, instead of storing the output data outputted from the application program therein, in response to the detection of the output-processing, the instruction information specifying an acquisition method by which an authorized client apparatus acquires the output data, and
the system wherein the client apparatus comprises:
at least one computer processing device;
a reading detection section for detecting reading-processing which is processing of reading data from the shared area; and
a reading control section which reads the instruction information from the shared area in response to the detection of the reading-processing, and which acquires the output data by the acquisition method specified by the instruction information.

2. The system according to claim 1,
wherein in response to the detection of the output-processing, the output control section stores, in the shared area, authentication data used for authenticating the authorized client apparatus, and furthermore stores the output data in a local area, which is accessible from the server apparatus and inaccessible from the client apparatus, and
in response to the detection of the reading-processing, the reading control section transmits the authentication data to the server apparatus in association with an output-data acquisition request, the authentication data being read as the instruction information,
the server apparatus further comprises an authentication section which authenticates the client apparatus based on the authentication data on receipt of the acquisition request and the authentication data, and which reads the output data from the local area to transmit the output data to the client apparatus, on condition that the authentication is succeeded.

3. The system according to claim 1, wherein:
in response to the detection of the output-processing, the output control section converts the output data into data in a form restorable by the authorized client apparatus, stores the converted output data in the shared area, and furthermore, stores, in the shared area, restoration information specifying a method of restoring the converted output data to the normal output data, as the instruction information; and
in response to the detection of the reading-processing, the reading control section restores the converted output data, based on the restoration information being read as the instruction information.

4. The system according to claim 3, wherein:
in response to the detection of the output-processing, the output control section encrypts the output data, stores the encrypted output data in the shared area, and furthermore, stores, in the shared area, a decrypting key for decrypting the encrypted output data, as the restoration information; and
in response to the detection of the reading-processing, the reading control section decrypts the encrypted output data by use of the decrypting key being read as the instruction information.

5. The system according to claim 3, wherein:
in response to the detection of the output-processing, the output control section divides the output data into a plurality of divided data, stores the divided output data in the shared area, and furthermore, stores, in the shared area, the restoration information specifying information for restoring the plurality of divided data to the normal output data; and
in response to the detection of the reading-processing, the reading control section restores the divided output data based on the restoration information read as the instruction information, by reading the plurality of divided data from the shared area and by connecting the plurality of divided data with one another.

6. The system according to claim 3, wherein:
in response to the detection of the output-processing, the output control section stores, in the shared area, the instruction information which includes an identifier specifying that data is not the output data but the instruction information; and
on condition that the identifier is included in data read from the shared area, the reading control section acquires the output data based on the instruction information, in response to the detection of the reading-processing.

7. The system according to claim 1, wherein:
the server apparatus is an apparatus providing, to the client apparatus, a display screen image composed of window images of the application program;
the output detection section detects, as the output-processing, data-copy-processing in which data displayed by the application program is outputted into the shared area as internally processed data different from the display screen image; and the reading detection section detects, as the reading-processing, data-paste-processing in which the internally processed data is read and managed so as to be editable from an application program of the client apparatus.

8. The system according to claim 1, wherein:
the shared area is an area for storing a print command which allows a printer to print information;
the output detection section detects, as the output-processing, processing in which a print command is outputted into the shared area so that data displayed by the application program can be printed by a printer accessible from the client apparatus;
and the reading detection section detects, as the reading-processing, processing in which the print command is read from the shared area so that the data displayed by the application program can be printed by the printer accessible from the client apparatus.

9. The system according to claim 1, wherein:
the shared area is a storage area managed by a file system of the client apparatus, and an area mounted as a part of a file system of the server apparatus so as to be made accessible from the server apparatus;
on condition that a target path which is designated for writing in the file system of the server apparatus by the application program is the shared area, the output detection section detects writing into the file system as the output-processing; and
the reading detection section detects an access from the client apparatus to the file system as the reading-processing.

10. A server apparatus in a system including the server apparatus, an application program and a client apparatus enabling a user to utilize the application program by communicating with the server apparatus based on an instruction of the user, the server apparatus comprising:
at least one computer processing device;
an output detection section for detecting output-processing which is processing of outputting data from the application program into a shared area used for having information shared between the server apparatus and the client apparatus; and
an output control section for storing instruction information in the shared area, instead of storing the output data outputted from the application program therein, in response to the detection of the output-processing, the instruction information specifying an acquisition method by which an authorized client apparatus acquires the output data.

11. A client apparatus in a system including a server apparatus, an application program and a client apparatus enabling a user to utilize the application program by communicating with the server apparatus based on an instruction of the user, the client apparatus comprising:
at least one computer processing device;
a reading detection section for detecting reading-processing which is processing of reading data from the shared area used for having information shared between the server apparatus and the client apparatus; and
a reading control section which reads, from the shared area, instruction information specifying an acquisition method by which an authorized client apparatus acquires output data from the server apparatus, in response to the detection of the reading-processing, and which acquires the output data by the acquisition method specified by the instruction information.

12. A computer-implemented method of controlling transmission and reception of data in a system including a server apparatus having at least one computer processing devices and an application program and a client apparatus enabling a user to use the application program by communicating with the server apparatus based on an instruction of the user, the method comprising the steps of:
in the server apparatus, detecting output-processing which is processing of outputting data from the application program into a shared area used for having information shared between the server apparatus and the client apparatus;
in the server apparatus, storing instruction information in the shared area, instead of storing the output data outputted from the application program therein, in response to the detection of the output-processing, the instruction information specifying an acquisition method by which an authorized client apparatus acquires the output data;
in the client apparatus, detecting reading-processing which is processing of reading data from the shared area; and
in the client apparatus, reading the instruction information from the shared area in response to the detection of the reading-processing, and acquiring the output data by the acquisition method specified by the instruction information.

13. A non-transitory computer-readable storage device storing a program for causing an information processing apparatus to function as a server apparatus in a system including the server apparatus, an application program and a client apparatus enabling a user to utilize the application program by communicating with the server apparatus based on an instruction of the user, the program for causing the information processing apparatus to function as:
an output detection section for detecting output-processing which is processing of outputting data from the application program into a shared area used for having information shared between the server apparatus and the client apparatus; and
an output control section for storing instruction information in the shared area, instead of storing the output data outputted from the application program therein, in response to the detection of the output-processing, the instruction information specifying an acquisition method by which an authorized client apparatus acquires the output data.

14. A non-transitory computer-readable storage device storing a program for causing an information processing apparatus to function as a client apparatus in a system including a server apparatus, an application program and the client apparatus enabling a user to utilize the application program by communicating with the server apparatus based on an instruction of the user, the program causing the information processing apparatus to function as:
a reading detection section for detecting reading-processing which is processing of reading data from the shared area used for having information shared between the sever apparatus and the client apparatus; and
a reading control section which reads, from the shared area, instruction information specifying an acquisition method by which an authorized client apparatus acquires output data from the server apparatus, in response to the detection of the reading-processing, and which acquires the output data by the acquisition method specified by the instruction information.

15. A computer-implemented method for implementing in a plurality of information processing apparatuses each having at least one computer processing device, a function of a server apparatus having an application program, and a function of a client apparatus which enables a user to utilize the application program by communicating with the server apparatus based on an instruction of the user, the method comprising the steps of:
implementing, in a first information processing apparatus, at least any one of a function for detecting output-processing which is processing of outputting data from the application program into a shared area used for having information shared between the server apparatus and the client apparatus, and a function for storing instruction information in the shared area, instead of storing the output data outputted from the application program therein, in response to the detection of the output-processing, the instruction information specifying an acquisition method by which an authorized client apparatus acquires the output data; and implementing, in a second information processing apparatus, at least any one of a function for detecting reading-processing which is processing of reading data from the shared area, and a function for reading the instruction information from the shared area and acquiring the output data by the acquisition method specified by the instruction information, in response to the detection of the reading-processing.

* * * * *